United States Patent
Wachter et al.

(10) Patent No.: US 11,662,029 B2
(45) Date of Patent: May 30, 2023

(54) FLOW CONTROL VALVE

(71) Applicant: THE BENTLEY GROUP LTD., Turks & Caicos Islands (TC)

(72) Inventors: Richard Wachter, Turks & Caicos Islands (TC); Nenad Pavlovic, Toronto (CA)

(73) Assignee: THE BENTLEY GROUP LTD. (TC)

( * ) Notice: Subject to any disclaimer, the term of this patent is extended or adjusted under 35 U.S.C. 154(b) by 0 days.

(21) Appl. No.: 17/582,107

(22) Filed: Jan. 24, 2022

(65) Prior Publication Data

US 2022/0145997 A1 May 12, 2022

Related U.S. Application Data

(63) Continuation of application No. 16/433,176, filed on Jun. 6, 2019, now Pat. No. 11,255,443.
(Continued)

(51) Int. Cl.
*F16K 3/02* (2006.01)
*F16K 15/18* (2006.01)
(Continued)

(52) U.S. Cl.
CPC .............. *F16K 3/02* (2013.01); *F16K 15/063* (2013.01); *F16K 15/18* (2013.01); *F16K 15/026* (2013.01);
(Continued)

(58) Field of Classification Search
CPC ................. F16K 15/063; F16K 15/026; Y10T 137/7854; Y10T 137/7857;
(Continued)

(56) References Cited

U.S. PATENT DOCUMENTS

| 967,514 A | 8/1910 | Groh | |
| 1,635,371 A * | 7/1927 | Levenson | F16N 21/04 137/543.17 |

(Continued)

FOREIGN PATENT DOCUMENTS

| CA | 535918 A | 1/1957 |
| DE | 19731557 A1 | 1/1999 |
| JP | 2018085317 A | 5/2018 |

OTHER PUBLICATIONS

European Examination Report for European Patent Application No. 19178870.2 dated Nov. 11, 2019.

*Primary Examiner* — Daphne M Barry
*Assistant Examiner* — Frederick D Soski
(74) *Attorney, Agent, or Firm* — Nelson Mullins Riley & Scarborough LLP

(57) ABSTRACT

Flow control valves may be positioned downstream of water meters to increase pressure and compress entrained water vapour passing through the meters. However, turbulence within such valves can cause the valve's head to move radially, bending a shaft within the valve which may break. Accordingly, there is provided a flow control valve comprising: a housing having a flow passage; a valve seat defined within the flow passage; a valve head moveable to a closed position to engage the valve seat and seal the flow passage; a shaft secured to the valve head; a support slidingly mounting the shaft within the housing; a spring biasing the valve head to the closed position and configured to maintain the valve head in the closed position until a predetermined pressure is applied; and a guide assembly extending along at least a portion of the flow passage to constrain radial movement of the valve head.

12 Claims, 14 Drawing Sheets

Related U.S. Application Data

(60) Provisional application No. 62/746,910, filed on Oct. 17, 2018, provisional application No. 62/681,834, filed on Jun. 7, 2018.

(51) Int. Cl.
*F16K 15/06* (2006.01)
*F16K 15/02* (2006.01)

(52) U.S. Cl.
CPC .... *Y10T 137/7857* (2015.04); *Y10T 137/7925* (2015.04); *Y10T 137/7929* (2015.04); *Y10T 137/7933* (2015.04); *Y10T 137/7936* (2015.04)

(58) Field of Classification Search
CPC ......... Y10T 137/7929; Y10T 137/7933; Y10T 137/7936
See application file for complete search history.

(56) References Cited

U.S. PATENT DOCUMENTS

| | | | |
|---|---|---|---|
| 1,785,271 A | 12/1930 | Lemex | |
| 2,071,390 A * | 2/1937 | Crowell | E21B 33/16 137/540 |
| 2,431,769 A | 12/1947 | Parker | |
| 2,667,895 A | 2/1954 | Pool et al. | |
| 2,670,759 A * | 3/1954 | St Clair | F16K 17/0426 137/540 |
| 2,771,091 A * | 11/1956 | Baker | E21B 21/10 137/454.2 |
| 2,800,142 A * | 7/1957 | Champion | G05D 16/103 251/364 |
| 2,804,281 A * | 8/1957 | Osburn | E21B 21/10 137/454.2 |
| 3,025,874 A * | 3/1962 | Yocum | F16K 1/36 137/540 |
| 3,029,835 A | 4/1962 | Biello et al. | |
| 3,145,724 A * | 8/1964 | Pelzer | E03C 1/108 137/526 |
| 3,422,840 A | 1/1969 | Bryant et al. | |
| 3,425,444 A | 2/1969 | Jones | |
| 3,438,391 A * | 4/1969 | Yocum | F16K 1/36 137/540 |
| 3,754,568 A | 8/1973 | Gallagher et al. | |
| 3,763,882 A * | 10/1973 | Shoop | F16K 15/026 137/494 |
| 3,943,969 A * | 3/1976 | Rubin | F16K 15/026 137/538 |
| 3,995,658 A * | 12/1976 | Hager | F16K 15/063 137/543 |
| 4,049,017 A | 9/1977 | Jones | |
| 4,149,560 A * | 4/1979 | Berg | F16K 15/026 251/150 |
| 4,364,411 A * | 12/1982 | Payton | F16K 15/026 137/513.5 |
| 4,437,492 A * | 3/1984 | Taylor | F16K 15/063 137/543.13 |
| 4,532,958 A * | 8/1985 | Napolitano | F16K 15/063 137/454.2 |
| 4,537,384 A * | 8/1985 | Petersen | F16K 15/063 137/542 |
| 4,667,697 A * | 5/1987 | Crawford | F16K 15/025 137/543.17 |
| 4,766,930 A * | 8/1988 | Patti | F16K 15/026 137/540 |
| 5,092,361 A * | 3/1992 | Masuyama | F16K 27/0209 251/368 |
| 5,174,327 A * | 12/1992 | Truax | F16K 27/0209 137/515.3 |
| 5,332,000 A * | 7/1994 | Gassner | F16K 17/0466 251/333 |
| 5,533,548 A * | 7/1996 | Grant | F16K 17/0466 137/540 |
| 5,704,391 A * | 1/1998 | McGowan, Jr. | F16K 17/12 137/454.2 |
| 6,039,073 A * | 3/2000 | Messick | F16K 15/063 137/542 |
| 6,132,176 A * | 10/2000 | Higgins | F16K 3/265 137/538 |
| 6,328,069 B1 * | 12/2001 | Schumann | F16K 15/026 137/881 |
| 6,564,828 B1 * | 5/2003 | Ishida | F16K 15/026 137/515.5 |
| 6,866,062 B2 | 3/2005 | Lammers | |
| 6,948,513 B2 * | 9/2005 | Steerman | B60S 1/52 239/284.1 |
| 6,955,339 B1 * | 10/2005 | Blume | F16K 15/063 251/367 |
| 7,581,560 B2 * | 9/2009 | Koch | F16K 15/028 137/513.5 |
| 7,762,276 B2 * | 7/2010 | Miller, Jr. | F16K 21/02 251/366 |
| 8,707,981 B2 | 4/2014 | Edgeworth | |
| 9,315,977 B1 * | 4/2016 | Gass | F16K 15/063 |
| 9,404,244 B1 * | 8/2016 | Gass | E03B 7/077 |
| 9,416,887 B2 | 8/2016 | Blume | |
| 9,644,356 B1 * | 5/2017 | Gass | E03B 7/078 |
| 9,777,850 B1 | 10/2017 | Handley et al. | |
| 10,125,476 B1 * | 11/2018 | Handley | F16K 15/063 |
| 10,444,773 B1 * | 10/2019 | Rowe | G05D 16/106 |
| 10,774,828 B1 * | 9/2020 | Smith | F04B 53/1022 |
| 11,231,118 B1 * | 1/2022 | Kubricky | F16K 15/063 |
| 11,242,849 B1 * | 2/2022 | Smith | F04B 1/053 |
| 11,255,443 B2 * | 2/2022 | Wachter | F16K 15/063 |
| 2007/0044848 A1 * | 3/2007 | Norman | F16K 27/0209 137/542 |
| 2007/0062603 A1 * | 3/2007 | Mackey | F16K 27/0209 141/113 |
| 2008/0210310 A1 * | 9/2008 | Gilcher | E03C 1/104 137/215 |
| 2009/0145487 A1 * | 6/2009 | Holden | F16K 15/025 137/315.04 |
| 2009/0283157 A1 * | 11/2009 | Hogan | F16K 15/063 137/542 |
| 2009/0289207 A1 | 11/2009 | Barreda et al. | |
| 2011/0248201 A1 * | 10/2011 | Kuo | F16K 17/0473 251/321 |
| 2013/0228241 A1 * | 9/2013 | Gass | E03B 7/078 137/535 |
| 2014/0182717 A1 | 7/2014 | Edgeworth | |
| 2014/0345706 A1 | 11/2014 | Maibaum et al. | |
| 2015/0233207 A1 * | 8/2015 | Osborne | E21B 34/08 166/373 |
| 2016/0169397 A1 * | 6/2016 | Ho | F16K 15/026 137/540 |
| 2016/0245414 A1 * | 8/2016 | Wu | F16K 15/063 |
| 2016/0348628 A1 | 12/2016 | Bean et al. | |
| 2017/0030614 A1 * | 2/2017 | Takada | F16K 17/0433 |
| 2017/0037989 A1 * | 2/2017 | Kuo | F16K 24/06 |
| 2017/0138493 A1 | 5/2017 | Yamaguchi | |
| 2017/0146139 A1 * | 5/2017 | Patterson | F16K 15/063 |
| 2017/0159834 A1 * | 6/2017 | Jeon | F16K 1/46 |
| 2017/0248242 A1 | 8/2017 | Hirotani | |
| 2018/0238458 A1 * | 8/2018 | Vallee | F01P 11/08 |
| 2018/0306340 A1 * | 10/2018 | Chalfin | E03B 7/077 |
| 2019/0195211 A1 * | 6/2019 | Sung | F04B 27/0873 |
| 2019/0242495 A1 | 8/2019 | Wada | |
| 2019/0383403 A1 * | 12/2019 | Wachter | F16K 15/063 |
| 2019/0383407 A1 * | 12/2019 | McLean Pe | F16K 15/063 |
| 2020/0200066 A1 * | 6/2020 | Perotto | F02M 57/025 |
| 2020/0400045 A1 * | 12/2020 | Lechler | B60T 17/04 |
| 2021/0033208 A1 * | 2/2021 | Nakamura | F16K 15/026 |
| 2021/0372529 A1 * | 12/2021 | Krohmer | F16K 15/066 |
| 2022/0034423 A1 * | 2/2022 | Kwiatkowski | F16K 37/0041 |
| 2022/0136612 A1 * | 5/2022 | Nakamura | F16K 1/46 137/540 |
| 2022/0145997 A1 * | 5/2022 | Wachter | F16K 15/063 |
| 2022/0260164 A1 * | 8/2022 | Clason | F16K 15/063 |

\* cited by examiner

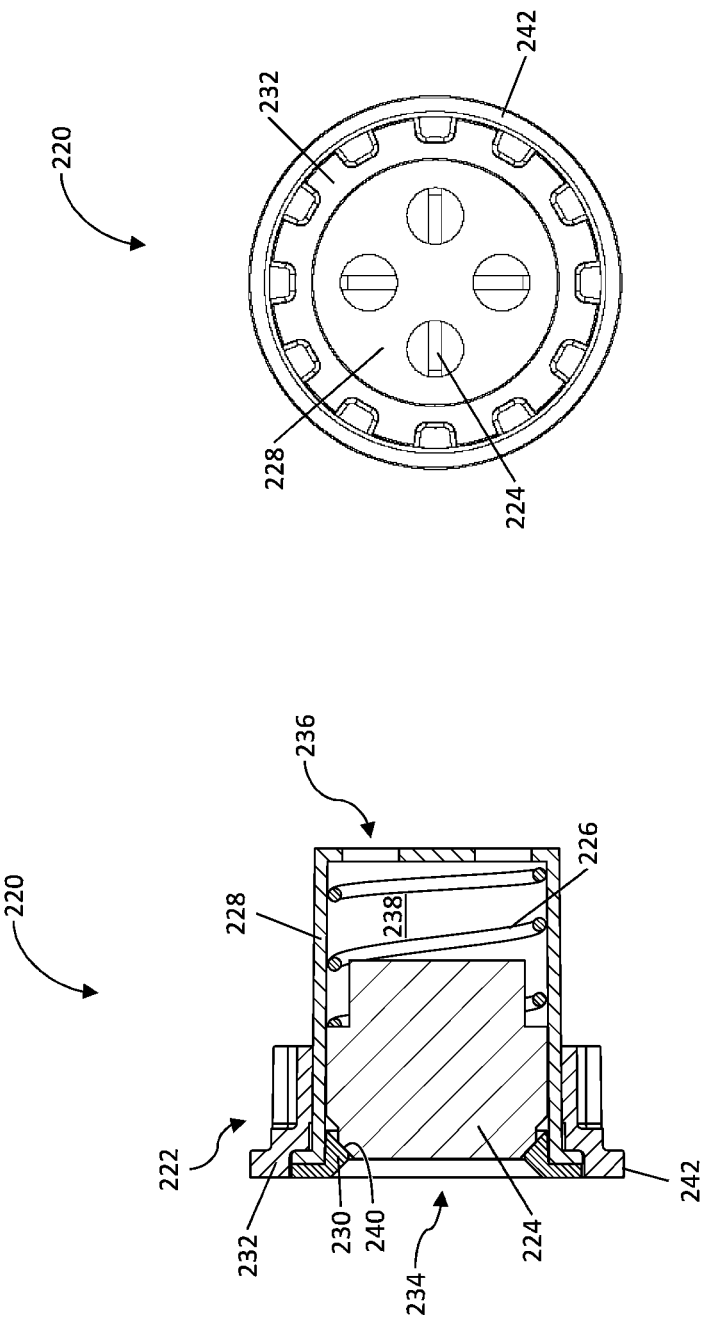

FLOW CONTROL VALVE

CROSS REFERENCE TO RELATED APPLICATIONS

This application in a continuation of U.S. patent application Ser. No. 16/433,176, filed Jun. 6, 2019, entitled "Flow Control Valve", which claims priority to U.S. Provisional Patent Application No. 62/681,834, filed Jun. 7, 2018, entitled "Flow Control Valve" and U.S. Provisional Patent Application No. 62/746,910, filed Oct. 17, 2018, also entitled "Flow Control Valve," wherein each of the foregoing is incorporated by reference in its entirety herein.

FIELD

The present disclosure generally relates to valves and more particularly to flow control valves.

BACKGROUND

Flow control valves are used to control the flow of fluids, such as water. U.S. Patent Application Publication No. 2009/0289207 to Barreda et al. discloses a valve assembly that is adapted to be disposed within a water supply line. The valve assembly is structured to reduce or significantly eliminate the passage of air and water vapour through a water meter measuring the water supply line. The valve body includes a sealing structure which is biased under a predetermined force into sealing relation with an inlet of valve assembly. The predetermined force is sufficient to prevent displacement of the sealing structure out of the sealing relation with the inlet until the force from a desired water pressure is exerted thereon. As a result, any air or water vapour within the water supply line will be compressed to reduce the flow measured through the water meter, thereby preventing unnecessary charges being made to a metered facility.

U.S. Patent Application Publication No. 2014/0182717 to Edgeworth discloses a system and an associated valve assembly that are adapted to increase the efficiency of an upstream water meter. By way of the valve assembly, entrained gas bubbles can be removed from a water supply. This, in turn, increases the density of the water running through the water meter. This ensures that the water meter is not inaccurately including entrained air or water vapour as metered water. The result is more accurate water readings and reduced utility bills.

While the contributions of existing flow control valves are laudable, improvements are generally desired. It is therefore an object of the present disclosure to provide a new and useful flow control valve that can be used in a water supply line.

SUMMARY

It should be appreciated that this Summary is provided to introduce a selection of concepts in a simplified form that are further described below in the Detailed Description of Embodiments. This Summary is not intended to be used to limit the scope of the claimed subject matter.

According to an aspect, there is provided a flow control valve comprising: a housing having an inlet, an outlet and a flow passage extending therebetween; a valve seat defined within the flow passage; a valve head positioned in the flow passage and movable between a closed position and an open position, wherein the valve head engages the valve seat in the closed position to seal the flow passage; a spring retained within the housing, the spring biasing the valve head to the closed position and configured to maintain the valve head in the closed position until a predetermined pressure is applied to the valve head from fluid at the inlet; and a guide assembly extending along at least a section of the flow passage, the guide assembly configured to engage the valve head to constrain radial movement of the valve head.

In some embodiments of the flow control valve, one or more of the following may be provided: the guide assembly is configured to constrain radial movement of the valve head when moving between the closed position and the open position; the guide assembly extends along the entire section of the flow passage; the guide assembly comprises at least one guide rail secured within the housing and positioned to engage the valve head; at least one void is formed in the valve head, the at least one void shaped to slidingly receive the at least one guide rail; and the at least one guide rail comprises a plurality of guide rails that are circumferentially positioned around the valve head.

In some embodiments of the flow control valve, one or more of the following may be provided: the flow control valve further comprises a shaft secured to the valve head and a support slidingly mounting the shaft within the housing; the support abuts an end of the spring to retain the spring within the housing; the support comprises a reversible bar secured to the housing and having a first face that is shaped to pre-compress the spring by a first amount and a second face that is shaped to pre-compress the spring by a second amount, the second amount being greater than the first amount; the predetermined pressure is approximately 45 psi when the spring is pre-compressed by the first amount and wherein the predetermined pressure is approximately 60 psi when the spring is pre-compressed by the second amount; the valve head comprises a removable wear cap that engages the valve seat when the valve head is in the closed position; the removable wear cap is formed of Teflon™; the valve seat is defined by a narrowed portion of the housing and the valve head is completely withdrawn from the narrowed portion when the valve head is in the open position; and the valve seat and the valve head define a seal plane and wherein the valve head comprises a flat face that does not extend upstream of the seal plane when in the closed positon and that is positioned downstream of the seal plane when in the open position.

According to another aspect, there is provided a flow control valve comprising: a housing having an inlet, an outlet and a flow passage extending therebetween, the housing defining a valve seat within the flow passage; a valve plug retained within the housing and movable between a closed position and an open position, the valve plug having a valve head for sealingly engaging the valve seat when the valve plug is in the closed position, to substantially prevent fluid flow through the flow passage, and further having a valve body extending downstream from the valve head and configured to slidingly engage an inner surface of the housing as the valve plug moves between the closed position and the open position, to constrain radial movement of the valve plug; and a spring retained within the housing, the spring biasing the valve plug towards the closed position and configured to maintain the valve plug in the closed position until a predetermined pressure is applied to the valve head from fluid at the inlet.

In some embodiments of the flow control valve, one or more of the following may be provided: the valve body comprises a plurality of fins that extend radially outward beyond an outer diameter of the valve head and are configured to slidingly engage the inner surface of the housing as the valve plug moves between the closed position and the open position, to constrain radial movement of the valve plug; the fins are arranged to constrain radial movement in a plurality of radial directions; the plural of radial directions includes a horizontal radial direction and a vertical radial direction; and the fins are arranged in one of a cross-shape and a Y-shape.

In some embodiments of the flow control valve, one or more of the following may be provided: the valve head has a flat upstream face that is configured to be completely retraced from the valve seat; the housing comprises a sleeve and an insert secured to the sleeve, and the sleeve defines the inner surface of the housing and the insert defines the valve seat; the sleeve has a hollow shape with an open upstream end and a partially closed downstream end, and the insert is secured at least partially within the upstream end of the sleeve; the partially closed downstream end includes at least one opening therethrough that defines the outlet of the housing; valve plug and the spring are retained within the sleeve and between the insert and the partially closed downstream end of the sleeve; and a downstream portion of the valve body in nested within the spring.

BRIEF DESCRIPTION OF THE DRAWINGS

Embodiments will now be described more fully with reference to the accompanying drawings, in which:

FIG. 9 is a cross-sectional side view of another embodiment of a flow control valve, in a closed positon;

FIG. 10 is a downstream end view of the flow control valve of FIG. 9;

DETAILED DESCRIPTION OF EMBODIMENTS

Figure 1:
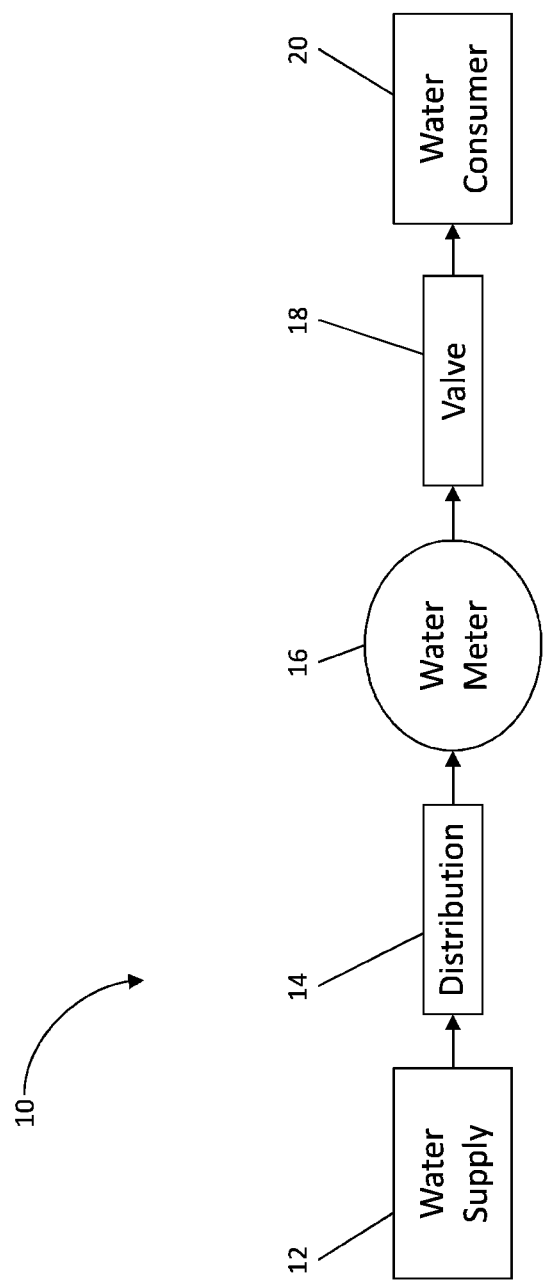
FIG. 1 is a schematic view of a water system.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising," "having" or "including" an element or feature or a plurality of elements or features having a particular property may further include additional elements or features not having that particular property. Also, it will be appreciated that the terms "comprises," "has" and "includes" mean "including but not limited to" and the terms "comprising," "having" and "including" have equivalent meanings.

As used herein, the term "and/or" can include any and all combinations of one or more of the associated listed elements or features.

It will be understood that when an element or feature is referred to as being "connected" another element or feature, that element or feature can be directly connected to the other element or feature or intervening elements may also be present.

It will be understood that spatially relative terms may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art.

FIG. 1 shows a water system generally identified by reference character 10. The system includes a water supply 12, a distribution network 14, a water meter 16, a flow control valve 18 and a water consumer 20. The water supply 12 can be, for example, a reservoir maintained by a utility or municipality. The reservoir may store a large volume of preferably potable water for distribution to one or more water consumers 20. These various water consumers 20 may be, for example, dwellings such as houses or office buildings or other water outlets that are accessed by individuals such as water fountains. The various water consumers 20 may also be industrial facilities, for example, bottling plants or manufacturing facilities. The distribution network 14 can be, for example, a number of water supply lines and/or return lines that are interconnected to the water supply 12. This distribution network 14 can interconnect the water consumers 20 to the water supply 12, with the water consumers 20 being downstream of the water supply 12.

The water meter 16 is interconnected and in line with the distribution network 14 upstream from an individual water consumer 20. The water meter 16 may be of a conventional construction such as a positive displacement meter. Those of ordinary skill in the art will recognize other types of water meters that can be used in the water system 10. The water meter 16 is typically maintained by the utility or municipality and is operable to measure the volume of water used by an individual water consumer 20 over a pre-determined period of time. As such, the water meter 16 is instrumental in determining the water bill for the water consumer 20. However, water meters typically measure volume alone, regardless of whether that volume includes liquid water ("water") or water with entrained water vapour and/or air ("water vapour"). Accordingly, measurements from water meters can be inaccurate and can overestimate the volume of water actually consumed.

Increasing the pressure in the water meter can help to compress any entrained water vapour and can help to reduce resultant inaccuracy and overestimation of water usage. Accordingly, the flow control valve 18 is positioned downstream of the water meter 16 and is intermediate the water meter 16 and the water consumer 20. As will be described in greater detail below, the valve 18 includes a spring biased valve head that is triggered at a predetermined water pressure. Water is permitted to pass through the valve 18 and to the water consumer 20 only after a build-up of sufficient water pressure upstream of the valve 18 is achieved. This can have the effect of compressing entrained water vapour upstream of the valve 18, which can increase the efficiency and accuracy of the water meter 16. In some valves, such as the one described in U.S. Patent Application Publication No. 2014/0182717, the valve head may be connected to a shaft within the valve and may be free to move radially within the valve when not engaging the valve seat. This radial movement of the valve head can cause the shaft to bend and eventually break. Accordingly, savings realized at the water meter 16 may be offset by repair costs to the valve 18.

FIGS. 2 to 7 show an embodiment of the flow control valve 18. The valve 18 is configured to remain closed and substantially prevent fluid flow therethrough until a predetermined pressure is established upstream of the valve 18. The valve 18 comprises a housing 22, a valve seat 24, a valve head 26, a shaft 28, a spring 30, a guide assembly 32 and a support 34.

Figure 7:
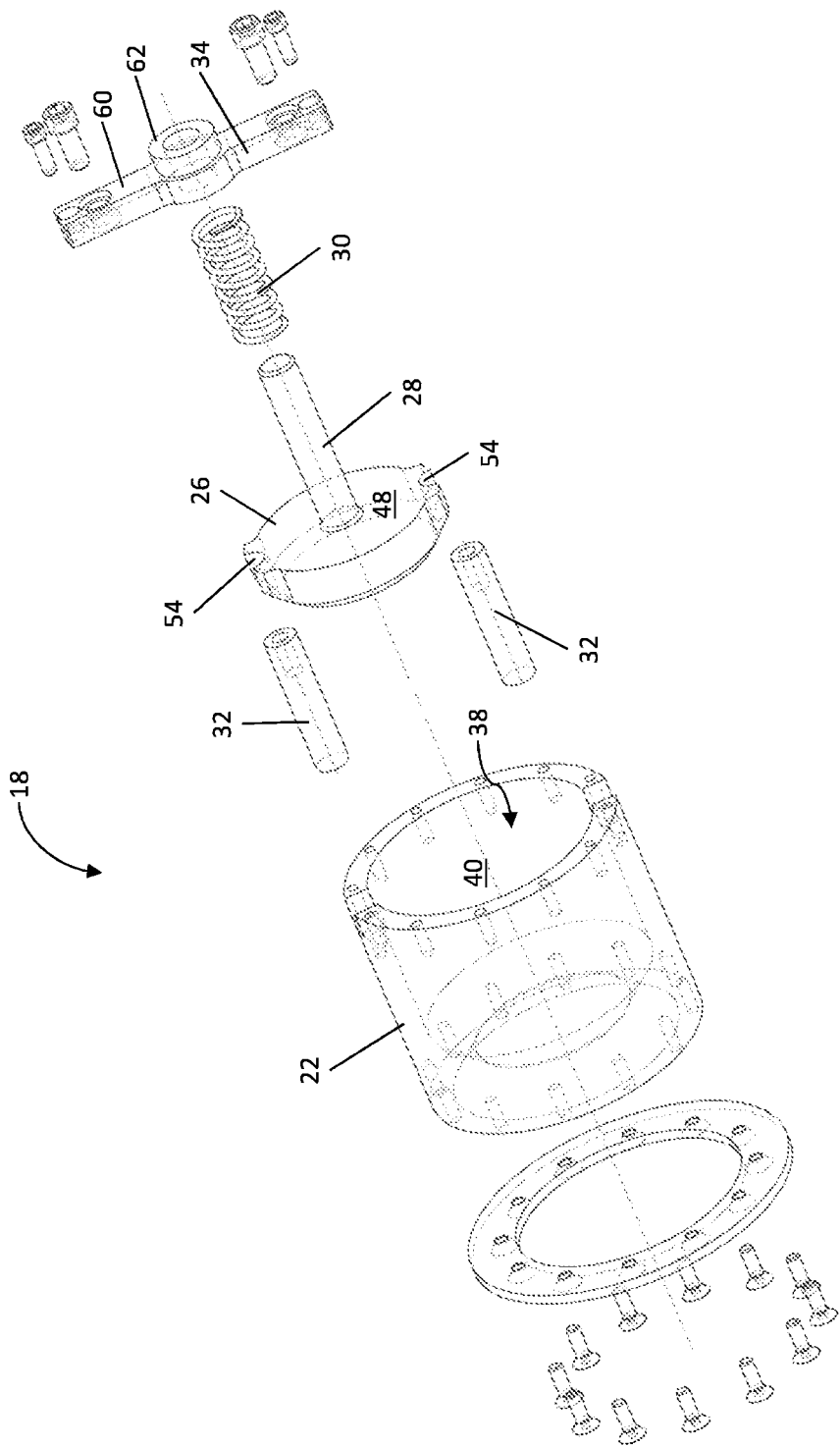
FIG. 7 is an exploded view of the flow control valve of FIG. 2, shown in transparency.
Figure 8:
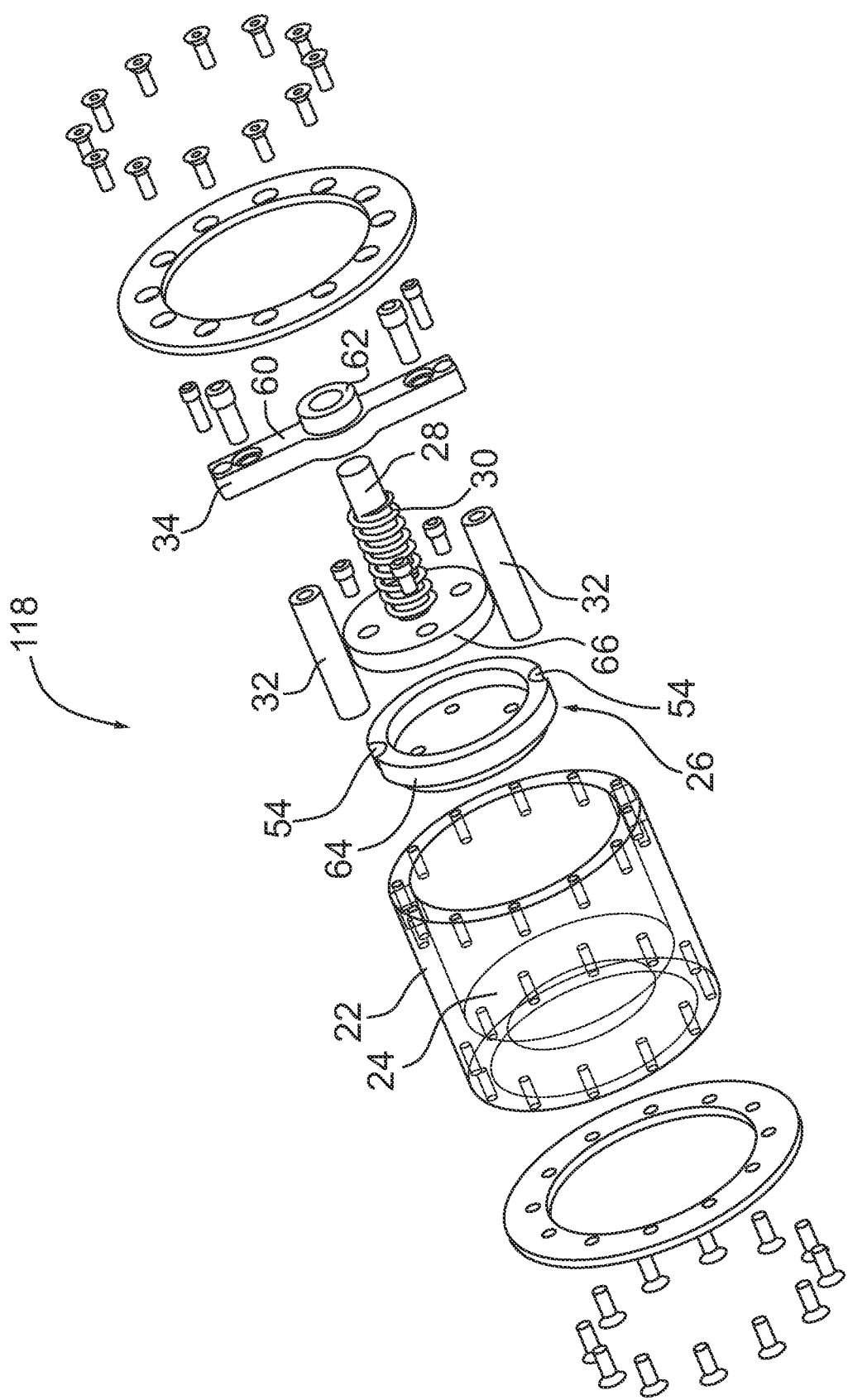
FIG. 8 is an exploded view of another embodiment of a flow control valve, shown with part of the housing in transparency.
Figure 11:
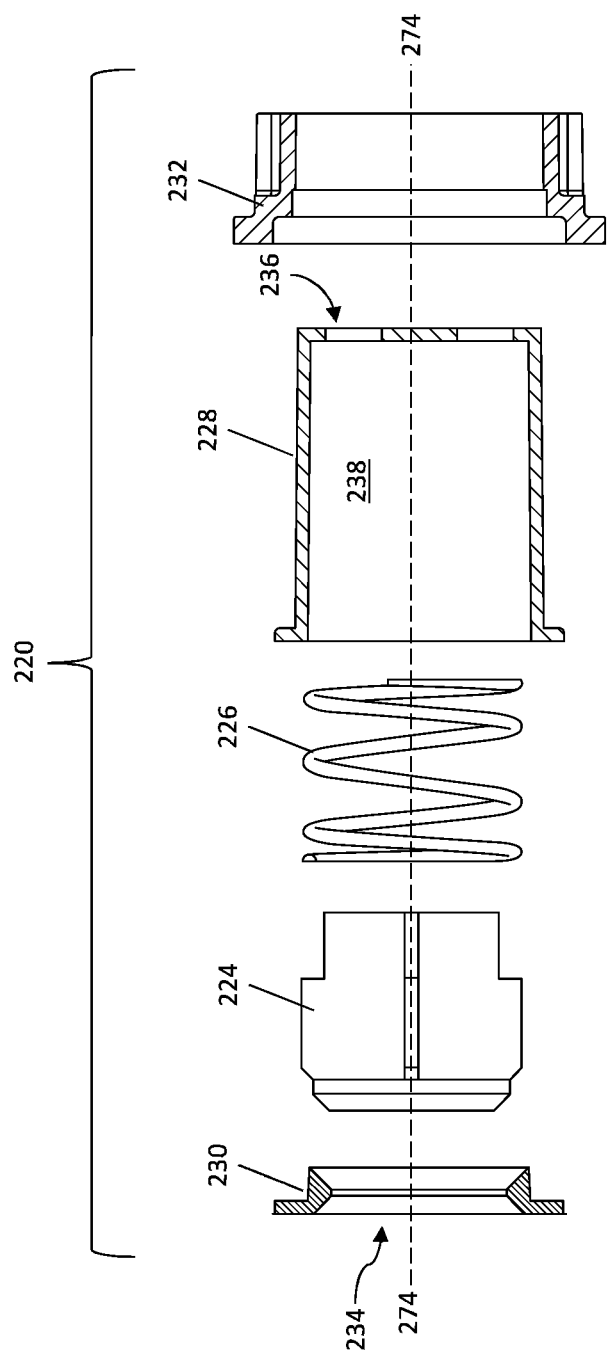
FIG. 11 is an exploded view of the flow control valve of FIG. 9.
Figure 13:
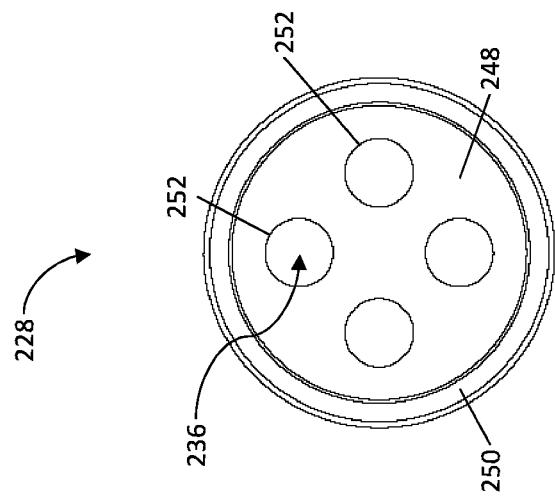
FIG. 13 is a downstream end view of the sleeve of FIG. 12.
Figure 12:
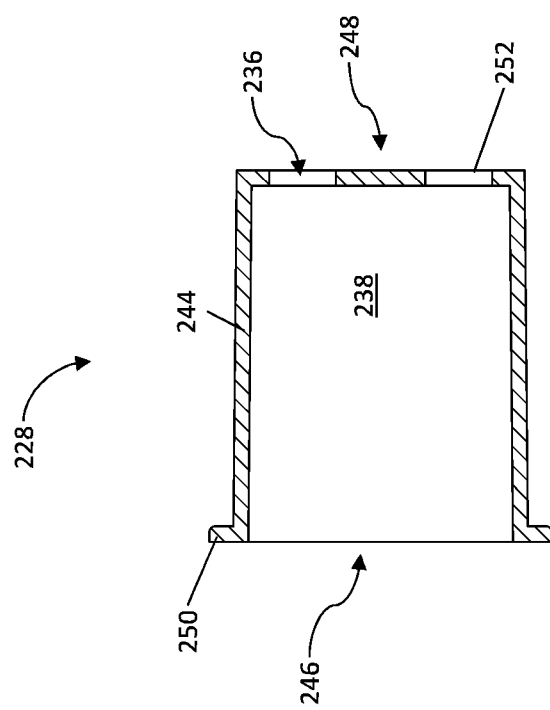
FIG. 12 is a cross-sectional side view of a sleeve of a housing of the flow control valve of FIG. 9.
Figure 15:
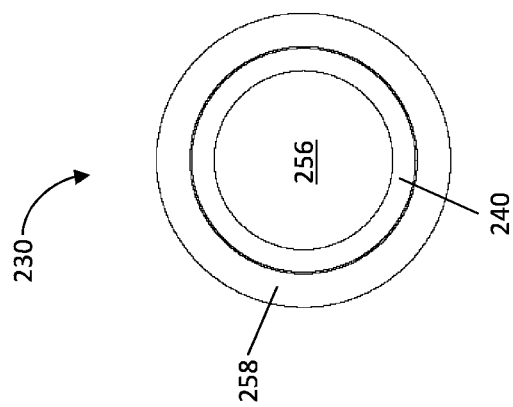
FIG. 15 is a downstream end view of the insert of FIG. 14.
Figure 14:
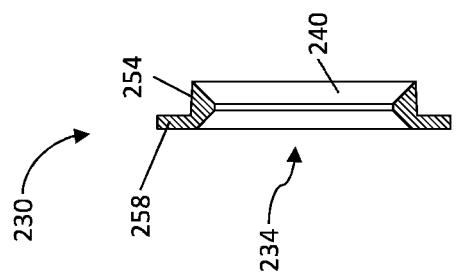
FIG. 14 is a cross-sectional side view of an insert of the housing of the flow control valve of FIG. 9.
Figure 17:
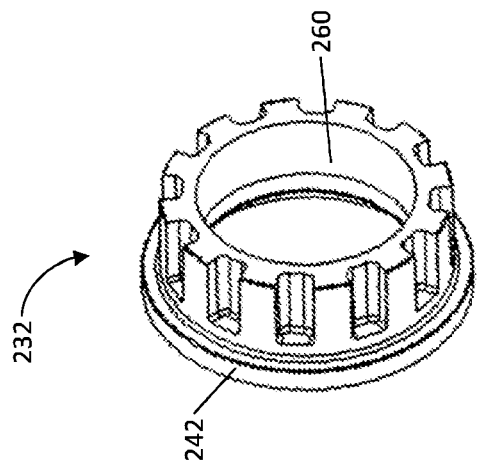
FIGS. 16 and 17 are axonometric views of a bushing of the housing of the flow control valve of FIG. 9, viewing an upstream end and a downstream end of the bushing, respectively.
Figure 16:
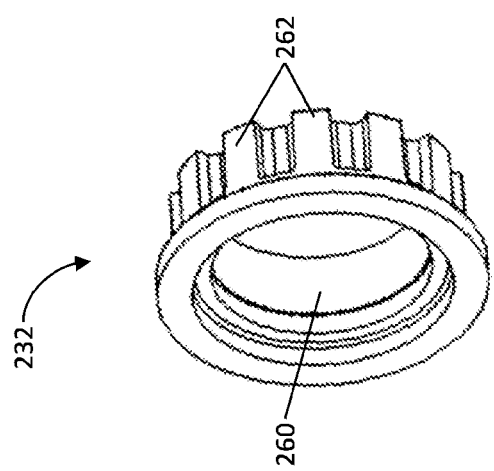
Figure 19:
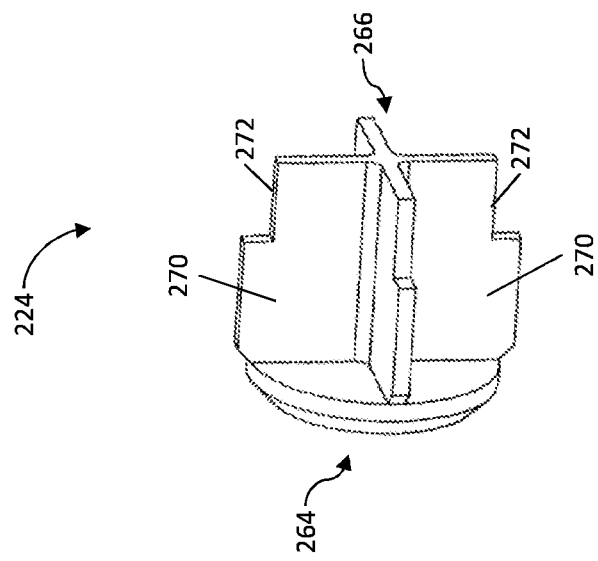
FIGS. 18 and 19 are axonometric views of a valve plug of the flow control valve of FIG. 9, viewing an upstream end and a downstream end of the valve plug, respectively.
Figure 18:
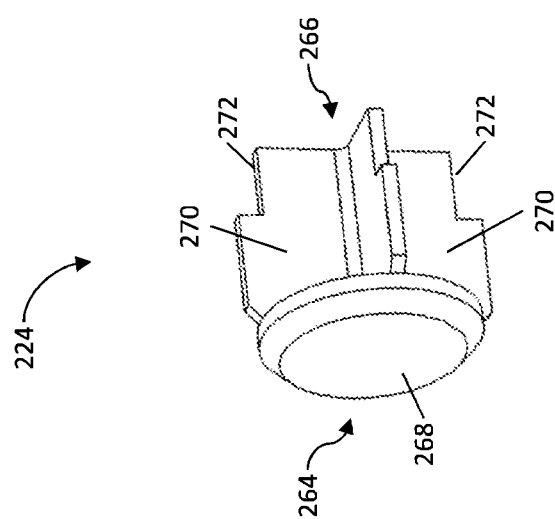

The housing 22 is configured to support the various components of the valve 18 and to secure the valve 18 to adjacent elements in the system 10, such as the water meter 16 or piping to the water consumer 20. The housing 22 comprises an inlet 36 located at an upstream end of the valve 18, an outlet 38 located at a downstream end of the valve 18 and flow passage 40 that extends within the housing 22 between the inlet 36 and the outlet 38. The housing 22 includes a flange for connecting to the adjacent elements in the system 10. Alternatively, the housing 22 may include other suitable means for connecting, such as a pair of flanges (as shown in FIG. 8), threading or the like. The housing 22 comprises a plurality of interconnected pieces that are secured together by fasteners (as shown in at least FIGS. 6 and 7) or, alternatively, may be secured by other known techniques such as welding, adhesives, etc. In yet other embodiments, the housing 22 can be integrally formed as a single piece.

Figure 2:
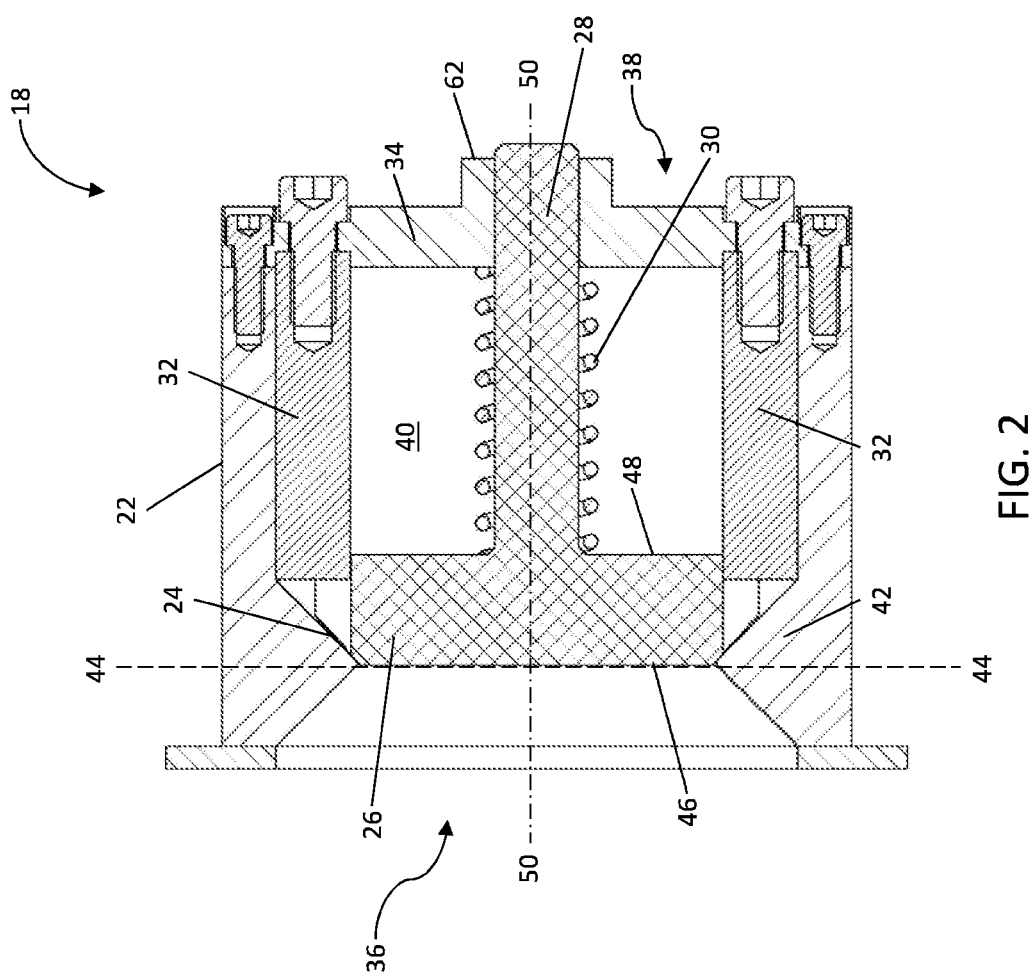
FIG. 2 is a cross-sectional side view of a flow control valve, in a closed position.
Figure 3:
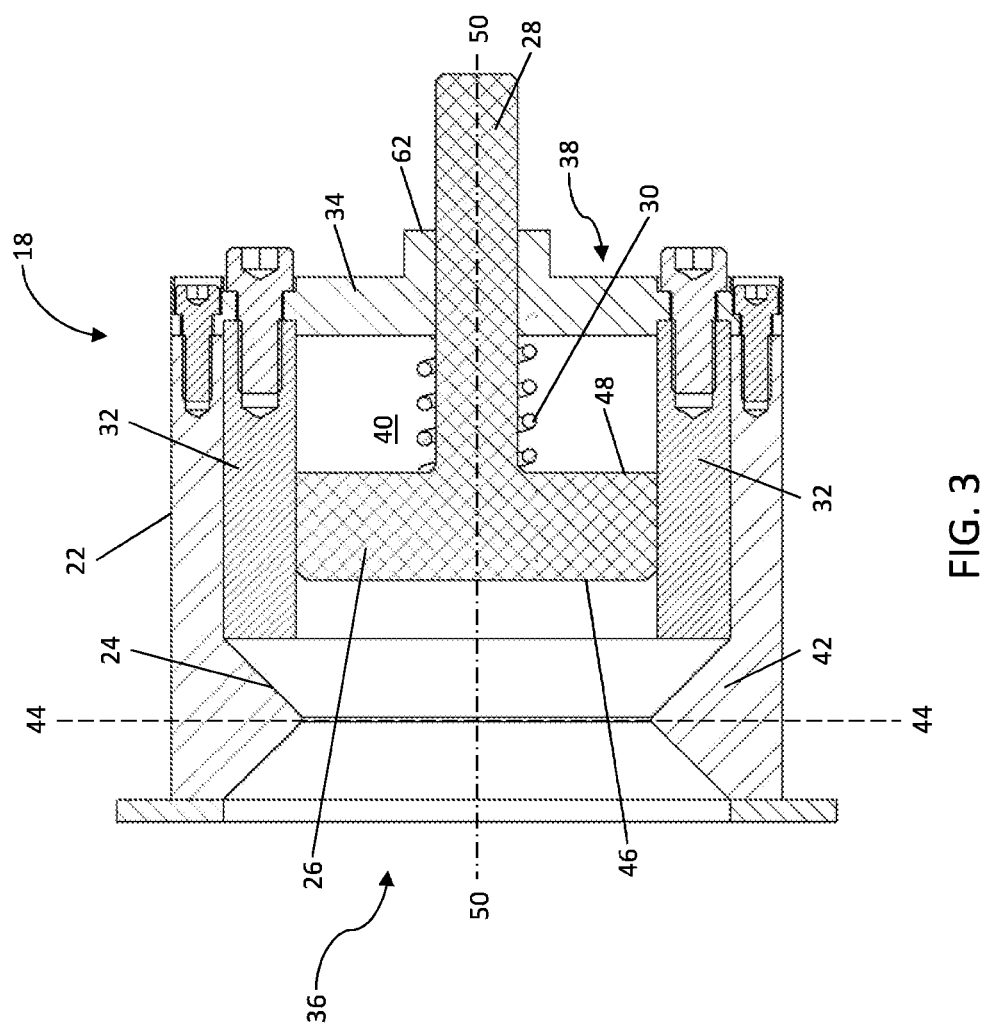
FIG. 3 is a cross-sectional side view of the flow-control valve of FIG. 2, in an open position.
Figure 4:
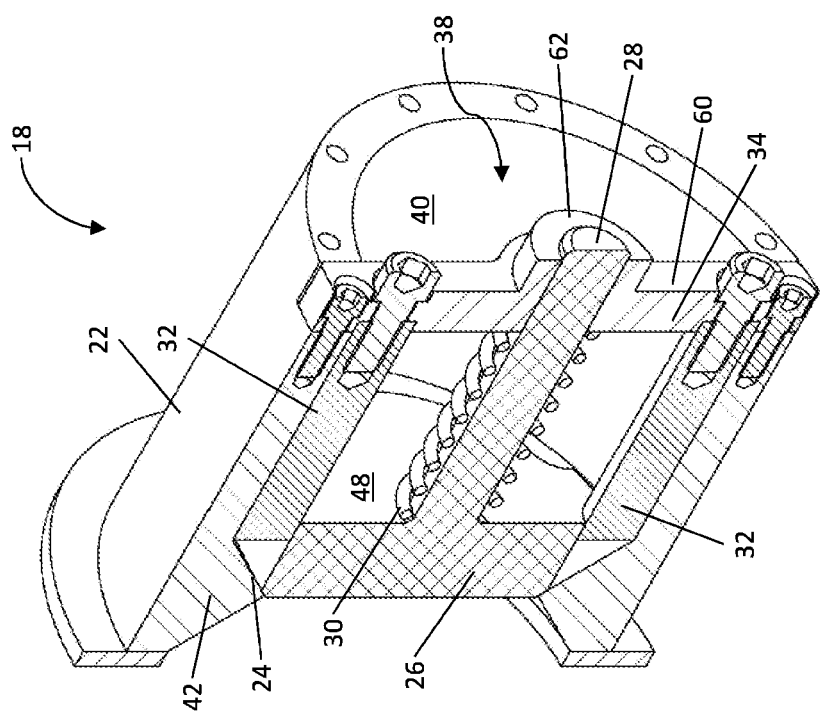
FIG. 4 is an axonometric cross-sectional view of the flow control valve of FIG. 2, viewed from a downstream end of the valve.
Figure 5:
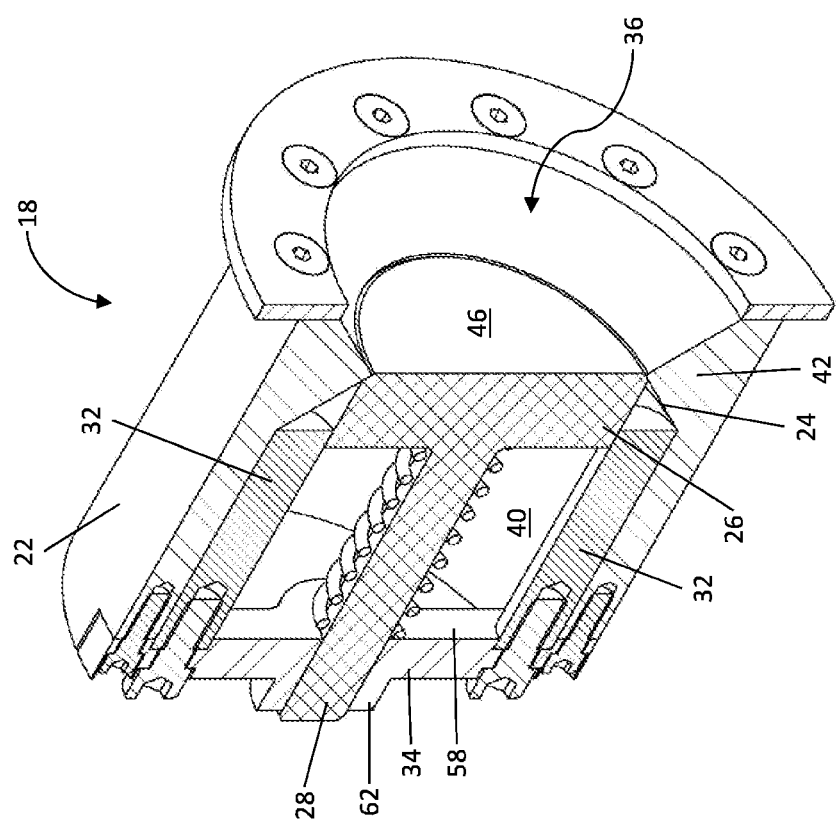
FIG. 5 is an axonometric cross-sectional view of the flow control valve of FIG. 2, viewed from an upstream end of the valve.
Figure 6:
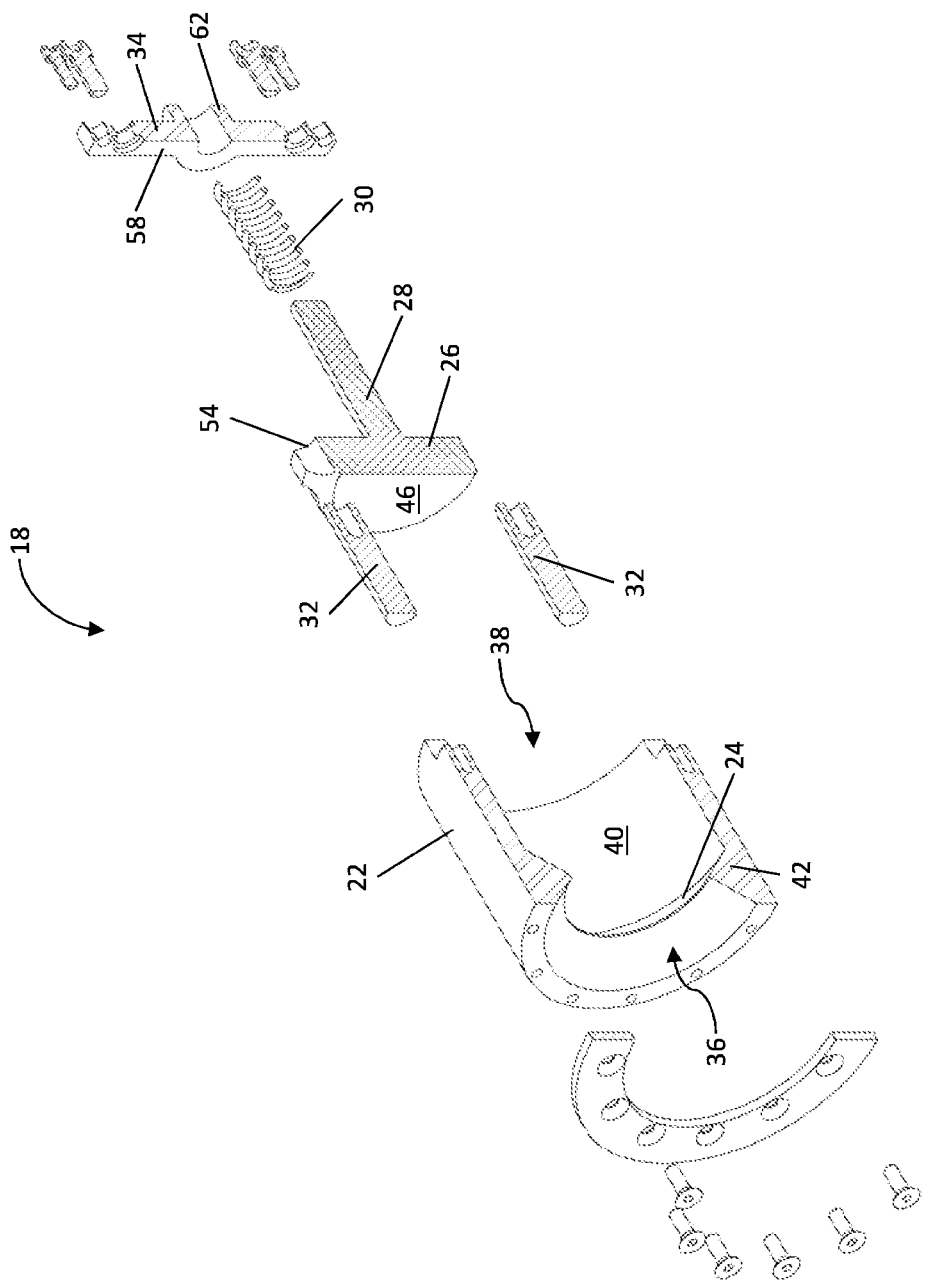
FIG. 6 is an exploded cross-sectional view of the flow control valve of FIG. 2.

The valve seat 24 has a complementary shape to the valve head 26 and is configured to form a seal with the valve head 26 when in a closed position (as shown in FIG. 2). Specifically, when the valve head 26 is in firm contact with the valve seat 24. The valve seat 24 is defined by a narrowed portion 42 of the housing 22, within the flow passage 40. The narrowed portion 42 of the housing 22 is integrally formed in the housing 22. Alternatively, the narrowed portion 24 can be formed by an insert in the housing 22. A seal plane 44 is defined by the valve seat 24 and the valve head 26 when in the closed position. As will be appreciated, fluid is substantially prevented from flowing past the seal plane 44 when the valve head 26 is in the closed position. Although the seal plane 44 is defined at the narrowest point in the valve seat 24 in the present embodiment (as shown in FIGS. 2 and 3), the seal plane 44 may be defined elsewhere on the valve seat 24 in other embodiments.

The valve head 26 has a complementary shape to the valve seat 24 and is configured to form a seal with the valve seat 24, when the valve head 26 is in the closed position. The valve head 26 is moveable between the closed position (shown in FIG. 2) and an open position (shown in FIG. 3), in a generally longitudinal direction of the valve 18. As will be appreciated, in the closed position the valve head 26 substantially seals and prevents fluid from passing through the valve 18. Whereas, in the open position, the valve head 26 allows fluid to pass through the valve 18, via the flow passage 40. Accordingly, the open position can be defined as any position where the valve head 26 does not seal the valve 18 and includes a fully open position, where the valve head 26 is spaced from the valve seat 24 by a maximum distance enabled by the valve 18. To limit obstruction from the valve head 26 when in the open position, the valve head 26 may be completely withdrawn from the narrowed portion 42 of the housing 22 when in the open position. In some embodiments, as shown, the valve head 26 has a flat upstream face 46 that does not extend upstream of the seal plane 44 in the closed position and which is positioned downstream of the seal plane 44 in the open position.

The shaft 28 is configured to at least partially support and position the valve head 26 within the flow passage 40. Accordingly, the shaft 28 is secured to a downstream face 48 of the valve head 26 and extends rearwardly therefrom, and the shaft 28 is slidingly mounted within the housing by support 34.

The spring 30 is configured to bias the valve head 26 to the closed position and is further configured to maintain the valve head 26 in the closed position until a predetermined pressure is applied to the upstream face 46 of the valve head 26 from fluid at the inlet 36. Accordingly, the spring 30 is secured within the housing 22, and has one end abutting the downstream face 48 of the valve head 26 and an opposite end abutting the support 34. In some embodiments, as shown, the spring 30 may be positioned surrounding the shaft 28. When the predetermined pressure is applied to the valve head 26 from fluid at the inlet 36, the force of the spring 30 is overcome and the valve head 26 will move out of the closed position and away from the valve seat 24. This allows fluid to flow through the open valve 18, via passage 40. As will be appreciated, the predetermined pressure at which the valve 18 opens will be correlated to at least the strength of the spring 30 (i.e. the spring's stiffness constant), the amount the spring 30 is pre-compressed (i.e. the difference between the length of the spring 30 when relaxed and the length of the spring 30 when positioned between the support 34 and the valve head 26 in the closed position) and the projected areas of the upstream face 46 and the downstream face 48 of the valve head 26. Accordingly, the predetermined pressure at which the valve 18 opens can be tuned based on the desired application of the valve 18. Common values for the predetermined pressure include 45 psi and 60 psi, but other values may also be used.

The guide assembly 32 is configured to constrain radial movement of the valve head 26 (i.e. movement in a direction generally perpendicular to the longitudinal axis 50 of the valve 18), particularly when moving between the open position and the closed position. Accordingly, the guide assembly 32 comprises a pair of guide rails that extend along a section of the flow passage 40. The guide rails 32 are secured within the housing 22 and extend along the entire section between the narrowed portion 42 and the support 34. One end of each of the guide rails 32 is positively secured to the support 34 by fasteners or the like, and the opposite end of each of the guide rails 32 is pressed against the narrowed portion 42 of the housing 22. The guide rails 32 are circumferentially positioned on opposite sides of the valve head 26 to engage the valve head 26 and constrain radial movement thereof. To further constrain radial movement, a pair of notches 54 are formed in the valve head 26 (as shown in FIG. 7). Each of the notches 54 is shaped to slidingly receive a corresponding one of the guide rails 32 to increase engagement between the valve head 26 and the guide rails 32. Accordingly, the notches 54 have complementary shapes to that of the guide rails 32 and are circumferentially spaced around the valve head 26 at positions corresponding to that of the guide rails 32. For example, as shown in FIG. 7, each of the notches 54 has a semi-circular shape that corresponds to the circular cross-sectional shape of the guide rail 32 and is circumferentially positioned on opposite sides of the valve head 26, similar to the guide rails 32. However, other suitable shapes and positions will be apparent to those skilled in the art in view of the present description.

The support 34 is configured to slidingly mount the shaft 28 within the housing 22. The support 34 is also configured to retain the spring 30 and the guide assembly 32 within the housing 22. In some embodiments, the support 34 is secured to the housing 22 by fasteners. Alternatively, the support 34 may be integrally formed with the housing 22. In the embodiment shown in FIGS. 2 to 7, the support 34 is secured to the housing 22 by fasteners and comprises a reversible bar. The reversible bar 34 has a first face 58 (shown in FIG. 5) and an opposite second face 60 (shown in FIG. 4). The first face 58 is shaped to pre-compress the spring 30 by a first amount and the second face 60 is shaped to pre-compress the spring 30 by a second amount that is different than the first amount. That is, the first face 58 is shaped to pre-compress the spring 30 to a first length when the support 34 is secured to the housing 22 and the spring 30 is positioned between the support 34 and the valve head 26 in the closed position, with the spring 30 abutting the first face 58. While the second face 60 is shaped to pre-compress the spring 30 to a second length when the support 34 is secured to the housing 22 and the spring 30 is positioned between the support 34 and the valve head 26 in the closed position, with the spring 30 abutting the second face 60. As shown in FIGS. 2 to 7, the first face 58 is flat and the second face 60 includes an extension 62, which pre-compresses the spring 30 farther than the flat first face 58. Accordingly, the second face 60 will pre-compress the spring 30 by a greater amount than the first face 58. This configuration allows the pre-compression of the spring 30 to be easily changed by reversing the orientation of the reversible bar 34 and, since the predetermined pressure is correlated to the pre-compression of the spring, this configuration allows the predetermined pressure at which the valve 18 opens to be easily changed as well. In the embodiment shown, the predetermined pressure may be approximately 45 psi when the spring 30 is pre-compressed by the first amount, using the first face 58, and may be approximately 60 psi when the spring 30 is pre-compressed by the second amount, using the second face 60 with extension 62. Although, it will be appreciated that in other embodiments the support 34 may be shaped to pre-compress the spring 30 by other amounts to provide other predetermined pressures, depending on the desired application of the valve 18.

When the valve 18 is in use, the spring 30 maintains the valve head 26 in the closed position until the predetermined pressure is applied to the upstream face 46 of the valve head 26 from fluid at the inlet 36. As described above, increasing the pressure upstream of the valve 18 can help compress any entrained water vapour in the system 10 and can help reduce resultant inaccuracy and overestimation of water usage. Once the predetermined pressure upstream of the valve 18 is reached, the valve head 26 will move out of the closed position and away from the valve seat 24, into the open position. Thus permitting water to flow through the valve 18, via the flow passage 40, to the water consumer 20.

When the predetermined pressure is applied to the valve head 26 from fluid at the inlet 36 and the valve head 26 begins to move out of the closed position, the guide rails 32 engage the sides of the valve head 26 via the notches 54. This engagement helps to constrain radial movement of the valve head 26 as it moves to the open position. Additionally, to constrain movement of the valve head 26 in radial directions that would not otherwise abut the guide rails 32, the notches 54 slidingly receive the guide rails 32 and increase engagement between the valve head 26 and the guide rails 32. Thus, the guide assembly 32 constrains radial movement of the valve head 26 when moving from the closed position to the open position and helps to reduce the likelihood that the shaft 28 will bend or break.

FIG. 8 shows another embodiment of a flow control valve generally identified by reference character 118. As will be appreciated, the flow control valve 118 is similar to the flow control valve 18, except the valve head 26 includes a removable wear cap 64 and a body 66, and the housing 22 includes a pair of flanges for connecting to the adjacent elements in the system 10.

The removable wear cap 64 is configured to form a seal with the valve seat 24, when the valve head 26 is in the closed position. Accordingly, the wear cap 64 has a complementary shape to that of the valve seat 24. As the flow control valve 118 is used over time, repeated sealing and unsealing of the wear cap 64 with the valve seat 24 can cause deterioration of the wear cap 64. Accordingly, the wear cap 64 is configured to be replaceable. That is, the wear cap 64 is secured to the body 66 of the valve head 26 by fasteners or the like and can be removed and replaced with a new wear cap, as needed. Alternatively, the wear cap 64 can be secured to the body 66 by threading, adhesives or other suitable securing means. In the present embodiment, the wear cap 64 is formed of Teflon™. Although, in other embodiments, the wear cap 64 can be formed of plastic, metal or other suitable materials. As shown in the embodiment in FIG. 8, the notches 54 are formed in the wear cap 64 of the valve head 26. Though, in alternative embodiments, it will be appreciated that the notches 54 can be formed in the body 66 of the valve head 26 and/or can be formed in both the body 66 and the wear cap 64.

The body 66 of the valve head 26 is configured to support the wear cap 64. Accordingly, the body 66 is secured to the wear cap 64, as described above, and the shaft 28 extends from the body 66 to the support 34.

Although the guide rails of the guide assembly 32 are shown and described as extending along the entire section of the flow passage 40 between the narrowed portion 42 of the housing 22 and the support 34, it will be appreciated that in other embodiments the guide rails 32 may extend along only part of that section. Bending of the shaft 28 is generally correlated to the length the shaft 28 is extended from the support 34, among other factors. Accordingly, in some embodiments it may only be necessary to constrain radial movement of the valve head 26 as the shaft 28 becomes increasingly extended from the support 34, such as when the valve head 26 approaches the closed position. In such embodiments, the guide rails 32, and hence the guide assembly 32, may only constrain radial movement of the valve head 26 during a portion of the movement between the closed position and the open position. In some embodiments, that portion of the movement may be when the valve head 26 is adjacent the closed position. Thus, in some embodiments, the guide rails and/or the guide assembly 32 may extend along at least a part of a section of the flow passage 40, such as along at least half of the section between the narrowed portion 42 and the support 34. In some embodiments, the guide rails and/or the guide assembly 32 may extend along only the part of the section between the narrowed portion 42 and the support 34 that is adjacent the valve seat 24.

Although the guide assembly 32 has been shown and described as comprising a pair of guide rails 32 and a pair of notches 54, it will be appreciated that in other embodiments the guide assembly 32 may comprise three or more guide rails 32 that are circumferentially positioned around the valve head 26. In some embodiments, such as embodiments with three or more guide rails 32, the notches 54 may be omitted entirely. Similarly, although the valve head 26 has been shown and described as comprising a pair of notches 54, it will be appreciated that in other embodiments the valve head 26 may comprise other types of voids, such as holes. In some embodiments, the valve head 26 may include a single void in the form of a hole through the valve head 26 and the guide assembly 32 may comprise a single guide rail 32 that passes through the hole to constrain radial movement of the valve head 26.

Although the guide rails 32 have been shown and described as having circular cross-sectional shapes and the voids 54 have been shown and described as having corresponding semi-circular shapes, in other embodiments other suitable shapes will be appreciated. In some embodiments, the guide assembly 32 could comprise one or more guide rails 32 with T-shaped or I-shaped cross-sections that engage correspondingly shaped voids in the valve head to constrain radial movement thereof. In other embodiments, the guide rails 32 may be wedge shaped, with a wider face of the wedge shape being slidingly received within the void to constrain radial movement of the valve head 26. A variety of suitable shapes for the guide rails 32 and the voids 54 will be apparent to those skilled in the art, in view of the present description.

FIGS. 9 to 19 show another embodiment of a flow control valve generally identified by reference character 220. The valve 220 can be used in the system 10, in a similar manner as the valve 18. The valve 220 is configured to remain closed and substantially prevent fluid flow therethrough until a predetermined pressure is established upstream of the valve 220. The valve 220 comprises a housing 222, a valve plug 224 and a spring 226. The valve plug 224 is secured within the housing 222 and is movable between a closed position (shown in FIG. 9), wherein the valve plug 224 substantially prevents fluid flow through the valve 220, and an open position, wherein the valve plug 224 permits fluid flow through the valve 220. The spring 226 is secured within the housing 222 and biases the valve plug 224 towards the closed position.

The housing 222 is configured to movably retain the valve plug 224 and the spring 226 therein. The housing 222 is further configured to be secured to adjacent elements of the system 10, such as the water meter 16 and the piping to the water consumer 20. The housing 222 comprises a sleeve 228, an insert 230 and a bushing 232. The sleeve 228, the insert 230 and the bushing 232 are interconnected by press-fits, threading, adhesives or the like to form the housing 222. When assembled, the housing 222 defines an inlet 234 at an upstream end of the valve 220, an outlet 236 at a downstream end of the valve 220 and a flow passage 238 through the valve 220 that extends from the inlet 234 to the outlet 236. The housing 222 further defines a valve seat 240 within the flow passage 238 for sealingly engaging the valve plug 224, when the valve plug 224 is in the closed positioned (as shown in FIG. 9). To secure the housing 222 to the adjacent elements of the system 10, the housing 222 includes an outwardly extending flange 242 that can be secured between the adjacent elements of the system 10. For example, the flange 242 may be pinched between the water meter 16 and the piping to the water consumer 20, such as between a downstream flange of the water meter 16 and an upstream flange of the piping to the consumer 20. In other embodiments, the flange 242 may be omitted and the housing 222 may be secured to the adjacent elements of the system 10 by threading, a pair of opposite end flanges, or other suitable securing mechanisms as would be appreciated by a person skilled in the art.

The sleeve 228 is configured to retain the valve plug 224 and the spring 226. The sleeve 228 has a hollow, generally cylindrical body 244 with an open upstream end 246 and a partially closed downstream end 248. A flange 250 extends outwardly from the upstream end 246 and is securely positioned between the insert 230 and the bushing 232, when the housing 222 is assembled. A plurality of openings 252 are formed in the downstream end 248 to permit fluid flow therethrough and define the outlet 236 of the housing 222. The upstream end 246 is configured to securely receive the insert 230 by a press-fit, threading, adhesive or the like. The sleeve 228 is sized to slidably retain the valve plug 224 and the spring 226 within the body 224 and between the insert 230 and the partially closed downstream end 246, when the insert 230 is secured in the sleeve 228. When the housing 222 is assembled, the sleeve 228 defines a portion of the flow passage 238 downstream of the insert 230.

The insert 230 is configured to secure the valve plug 224 and the spring 226 within the sleeve 228. The insert 230 is further configured to form the valve seat 240. The insert 230 has a generally ring-shaped body 254 with a through-passage 256 that is narrower than an outer diameter of the valve plug 224. Accordingly, the valve plug 224 cannot pass through the through-passage 256. The body 254 includes a tapered inner surface that defines the valve seat 240. A flange 258 extends outwardly from the body 254 at an upstream end thereof and is securely positioned adjacent the flange 250 of the sleeve 228, when the housing 222 is assembled. A downstream end of the insert 230 is sized to fit within the upstream end 246 of the sleeve 228 and is configured to be secured to the sleeve 228 by a press-fit, threading, an adhesive or the like. When the housing 222 is assembled, the insert 230 defines the inlet 234 of the housing 222. The insert 230 further defines a portion of the flow passage 238 downstream of the inlet 236.

The bushing 232 is configured to be secured to the adjacent elements of the system 10. The bushing 232 is further configured to be secured to at least one of the sleeve 228 and the insert 230, to secure the housing 222 to the adjacent elements of the system 10. The bushing 232 has a generally ring-shaped body 260 that is sized to matingly receive the sleeve 228 therethrough and is configured to be secured to the sleeve 228 by a press-fit, threading, an adhesive or the like. The bushing 232 also includes the flange 242 of the housing 222, which extends outwardly from the body 260 of the bushing 232 and is configured to be secured in the system 10, as described above. The outer surface of the body 260 may include a plurality of ridges 262.

The valve plug 224 is configured to substantially prevent fluid flow through the valve 220, when the valve plug 224 is in the closed position (shown in FIG. 9), and to permit fluid flow through the valve 220, when the valve plug 224 is in the open position. The valve plug 224 is further configured to constrain radial movement of the valve plug 224 when moving between the closed position and the open position. The valve plug 224 comprises a valve head 264 and a valve body 266. The valve head 264 is connected to the valve body 266 at an upstream end thereof. The valve head 264 has a complementary shape to the valve seat 240 and is configured to sealingly engage the valve seat 240 when the valve plug 224 is in the closed position, to substantially prevent fluid flow through the valve 220 and to seal the flow passage 238. The valve head 264 has a flat upstream face 268 that can be completely retracted from the valve seat 240 when the valve plug 224 is in the open position, to limit obstruction of fluid flow through the valve 220. The valve body 266 extends downstream from the valve head 264 and includes a plurality of outwardly extending fins 270. The fins 270 extend radially beyond an outer diameter of the valve head 264 and are configured to slidingly engage an inner surface of the sleeve 228 as the valve plug 224 moves between the closed position and the open position, to constrain radial movement of the valve plug 224. The fins 270 are arranged in a cross-shape to constrain radial movement in substantially all radial directions perpendicular to a longitudinal axis 274 of the valve 220 (such as movement in both a vertical radial direction and a horizontal radial direction). Although, in other embodiments, the fins 270 may be arranged in another suitable shape, such as a Y-shape. Each of the fins 270 includes a notch 272 at a downstream end thereof. The notches 272 are sized to receive the spring 226 and are configured to permit a downstream portion of the valve body 266 to be nested within the spring 226 (as shown in FIG. 9).

The spring 226 is configured to bias the valve plug 224 to the closed position and is further configured to maintain the valve plug 224 in the closed position until a predetermined pressure is applied to the valve plug 224 from fluid at the inlet 234. The spring 226 is positioned within the housing 222 and has one end abutting the valve plug 224 and an opposite end abutting the housing 222. As will be appreciated, the predetermined pressure will be partially dependent on the force of the spring 226 biasing the valve plug 224 to the closed position. The force of the spring is correlated to at least the strength of the spring 226 (i.e. the spring's stiffness constant) and the amount the spring 226 is pre-compressed (i.e. the difference between the length of the spring 226 when relaxed and the length of the spring 226 when positioned between the valve plug 224 and the housing 222, with the valve plug 224 in the closed position). Accordingly, the predetermined pressure can be tuned based on the desired application of the valve 220. Common values for the predetermined pressure include 45 psi and 60 psi, but other values may also be used.

When the valve 220 is in use, the spring 226 maintains the valve plug 224 in the closed position until the predetermined pressure is applied to the valve plug 224 from fluid at the inlet 234. When the predetermined pressure is applied the valve plug 224, the force of the spring 226 will be overcome and the valve plug 224 will move out of the closed position and towards the open position. As the valve plug 224 moves out of the closed position, the valve head 264 will move away from the valve seat 240 and will no longer sealingly engage the valve seat 240. This will allow fluid to flow through the valve 220, via the flow passage 238, from the inlet 234 to the outlet 236. In this manner, the valve 220 can substantially prevent fluid flow through the valve 220 until the pressure upstream of the valve 220 is increased to the predetermined pressure and, thereafter, permit fluid flow through the valve 220. As described above, increasing the pressure upstream of the flow control valve in a system 10 can compress entrained water vapour in the system 10 and may help reduce resultant inaccuracy and overestimation of water usage by the water meter 16 in the system 10.

Moreover, as the valve plug 224 moves between the closed position and the open position, the fins 270 of the valve body 266 will slidingly engage the sleeve 228 of the housing 222 to constrain radial movement of the valve plug 224. Constraining radial movement of the valve plug 224 may help to reduce wear and potential damage to the valve plug 224 caused by vibration of the plug 224 within the housing 222. Additionally, constraining radial movement of the valve plug 224 as the valve plug moves from the open position to the closed position may help to align the valve head 264 with the valve seat 240 as the valve plug 224 moves to the closed position, which may help to ensure sealing engagement between the valve plug 224 and the valve seat 240.

In an alternative embodiment, the fins 270 extend radially beyond the outer diameter of the valve head 264 and are configured to engage the inner surface of the sleeve 228 as the valve plug 224 moves between the closed position and the open position, to constrain radial movement of the valve plug 224. Such a configuration may not constrain the radial movement of the valve plug 224 as much as the previously described embodiment, which slidably engages the inner surface of the sleeve 228. However, the radial movement of the valve plug 224 may be sufficiently constrained, depending on the implementation.

Although embodiments have been described above and are shown in the accompanying drawings, it will be appreciated by those skilled in the art that variations and modifications may be made without departing from the scope defined by the appended claims, and the scope of the claims should be given the broadest interpretation consistent with the specification as a whole.

What is claimed is:

1. A flow control valve for fluid piping, the flow control valve comprising:
   a housing, the housing including a sleeve, an insert, a bushing, an inlet, and an outlet;
   a spring; and
   a valve plug,
   wherein the valve plug is retained within the housing and movable between an open position and a closed position in which the valve plug engages a valve seat formed by the insert,
   wherein the spring is retained between the valve plug and the sleeve, the spring biasing the valve plug towards the closed position,
   wherein the bushing secures the flow control valve for governing fluid flow through the fluid piping, and
   wherein a body of the bushing has a plurality of longitudinal ridges along an axis of symmetry of the sleeve.

2. The flow control valve of claim 1, wherein the valve plug has a valve head and a valve body, and wherein the valve body comprises a plurality of fins that extend radially outward beyond an outer diameter of the valve head and slidingly engage an inner surface of the sleeve as the valve plug moves between the closed position and the open position constraining radial movement of the valve plug.

3. The flow control valve of claim 2, wherein the fins constrain radial movement of the valve plug within the sleeve in a plurality of radial directions.

4. The flow control valve of claim 3, wherein the plural of radial directions includes a first radial direction and a second radial direction, and wherein the first radial direction is 90 degrees apart from the second radial direction.

5. The flow control valve of claim 3, wherein the fins are arranged in a cross-shape.

6. The flow control valve of claim 3, wherein the fins are arranged in a Y shape.

7. The flow control valve of claim 1, wherein the sleeve has a hollow shape with an open upstream end and a partially closed downstream end, and wherein the insert is secured at least partially within the open upstream end of the sleeve.

8. The flow control valve of claim 7, wherein the partially closed downstream end includes at least one opening therethrough that defines the outlet of the housing.

9. The flow control valve of claim 1, wherein a valve head of the valve plug has a flat upstream face that is completely retracted from the valve seat when the valve plug is in the open position.

10. The flow control valve of claim 1, wherein a downstream portion of the valve plug is nested within the spring.

11. The flow control valve of claim 1, wherein the spring biases the valve plug in the closed position until a predetermined pressure is applied to a valve head of the valve plug from fluid at the inlet.

12. The flow control valve of claim 1, wherein the plurality of longitudinal ridges are provided along an outer surface of the body of the bushing.

* * * * *